United States Patent
Cheng et al.

(10) Patent No.: US 9,490,655 B2
(45) Date of Patent: Nov. 8, 2016

(54) WIRELESS CHARGING DEVICE FOR VEHICLES

(71) Applicant: HON HAI PRECISION INDUSTRY CO., LTD., New Taipei (TW)

(72) Inventors: Chia-Chieh Cheng, New Taipei (TW); Chia-Yen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 206 days.

(21) Appl. No.: 14/510,977

(22) Filed: Oct. 9, 2014

(65) Prior Publication Data

US 2016/0036262 A1 Feb. 4, 2016

(30) Foreign Application Priority Data

Jul. 30, 2014 (TW) .............................. 103125930 A

(51) Int. Cl.
| | |
|---|---|
| *H01M 10/46* | (2006.01) |
| *H02J 7/02* | (2016.01) |
| *H02J 7/00* | (2006.01) |
| *B60R 11/02* | (2006.01) |
| *B60R 11/00* | (2006.01) |

(52) U.S. Cl.
CPC ............... *H02J 7/025* (2013.01); *B60R 11/02* (2013.01); *H02J 7/0044* (2013.01); *B60R 2011/0075* (2013.01)

(58) Field of Classification Search
CPC ........ H02J 5/005; H02J 50/00; H02J 7/0025; H02J 7/0042; H02J 7/355

USPC .................. 320/107, 108, 114, 115; 307/104
See application file for complete search history.

(56) References Cited

U.S. PATENT DOCUMENTS

| | | | |
|---|---|---|---|
| 7,548,040 B2 * | 6/2009 | Lee ...................... | H04R 1/1025 320/108 |
| 7,746,028 B1 * | 6/2010 | Yang ...................... | H04M 1/05 320/107 |
| 2007/0281619 A1 | 12/2007 | Chen | |
| 2011/0079701 A1 * | 4/2011 | Hayashi ................. | F16M 13/00 248/636 |
| 2013/0038138 A1 * | 2/2013 | Cook ..................... | H01Q 1/248 307/104 |
| 2014/0111147 A1 * | 4/2014 | Soar ...................... | H01F 27/365 320/108 |

FOREIGN PATENT DOCUMENTS

DE          102013200811 A1      7/2014

* cited by examiner

*Primary Examiner* — Edward Tso
(74) *Attorney, Agent, or Firm* — Zhigang Ma

(57) ABSTRACT

A wireless charging device for vehicles includes a socket and a charging holder mounted to the socket. The wireless charging device for vehicles is configured to charge an electronic device. The socket includes a petal shaped spring portion and a protruding portion formed in the center of the spring portion. The charging holder includes a base, a first sidewall, a second sidewall, and an opening between the first sidewall and the second sidewall. The second sidewall includes a wireless charging module. The wireless charging device for vehicles of the present disclosure can charge different sizes of electronic devices and can be stable and convenient.

10 Claims, 3 Drawing Sheets

WIRELESS CHARGING DEVICE FOR VEHICLES

FIELD

The subject matter herein generally relates to a wireless charging device, and in particular to a wireless charging device that can be used in a vehicle.

BACKGROUND

Wireless communication devices need to be charged. A wireless charging device is a non-contact type charging system based on electromagnetic induction. The wireless charging device is employed to supply electric power for charging the battery of wireless communication devices wirelessly. Thus, the battery can be charged easily without requiring a wire.

BRIEF DESCRIPTION OF THE DRAWINGS

Implementations of the present technology will now be described, by way of example only, with reference to the attached figures.

DETAILED DESCRIPTION

Figure 1:
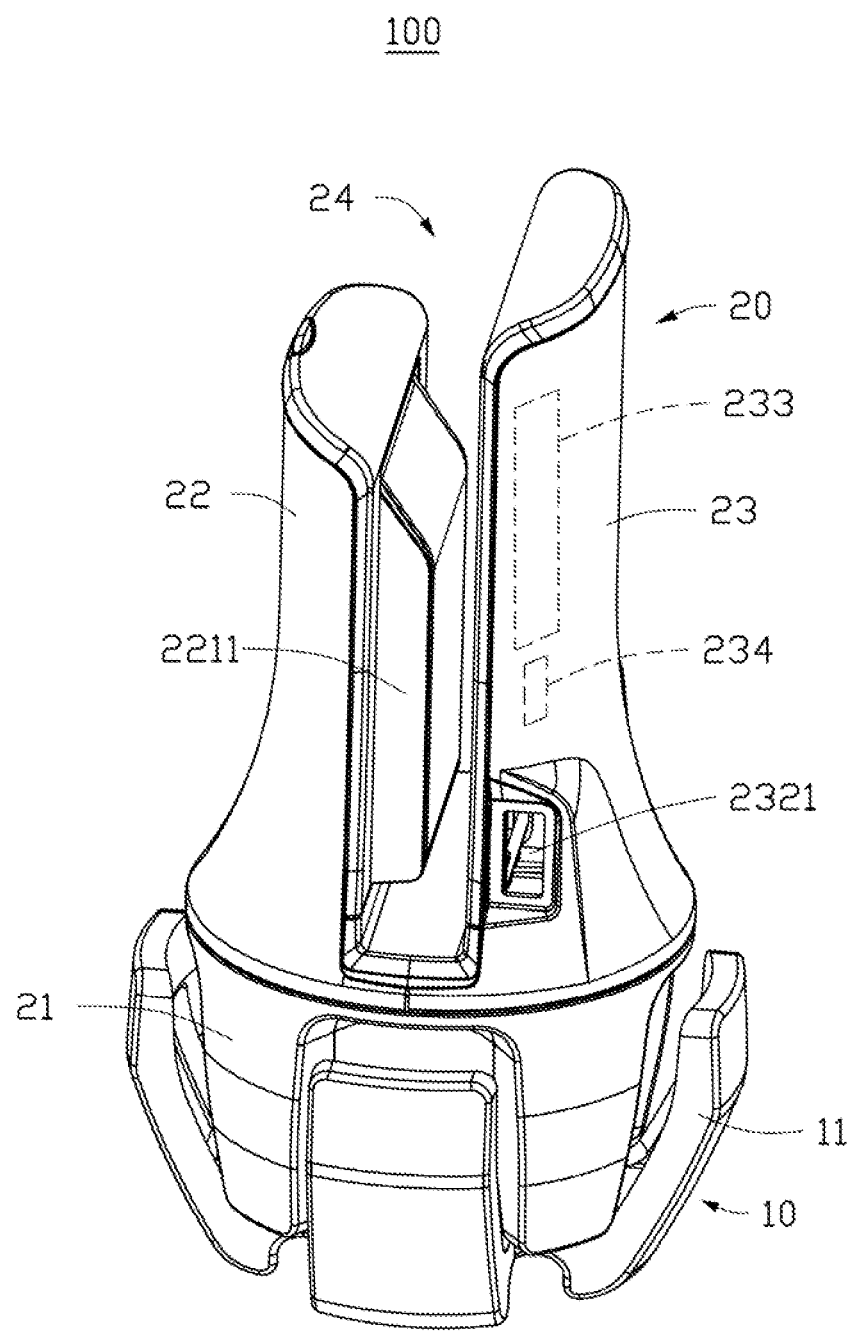
FIG. 1 is an isometric view of an embodiment of a wireless charging device for vehicles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of a wireless charging device for vehicles 100. The wireless charging device for vehicles 100 can include a socket 10 and a charging holder 20 elastically mounted to the socket 10. The socket 10 can be placed in a cup holder or other space in a vehicle. The charging holder 20 can be substantially a cylinder.

The socket 10 can be pressed through an extrusion of the cup holder or other space of the vehicle to detachably clamp the charging holder 20, and the charging holder 20 can be securely mounted in the vehicle. Thus, the wireless charging device for vehicles 100 can be used in different vehicles. When the socket 10 is taken out of the cup holder, the charging holder 20 can be easily removed from the socket 10.

The socket 10 can include a spring portion 11 distributed in a substantially petal shape. The charging holder 20 can include a base 21, a first sidewall 22 and a second sidewall 23 extending from the base 21, and an opening 24 between the first sidewall 22 and the second sidewall 23. A position of the second sidewall 23 adjacent to the base 21 can define a universal serial bus (USB) port 2321. In other embodiments, the USB port 2321 can be a micro USB port or a universal parallel bus port. The opening 24 can be configured to receive electronic devices (not shown) of different sizes.

Figure 2:
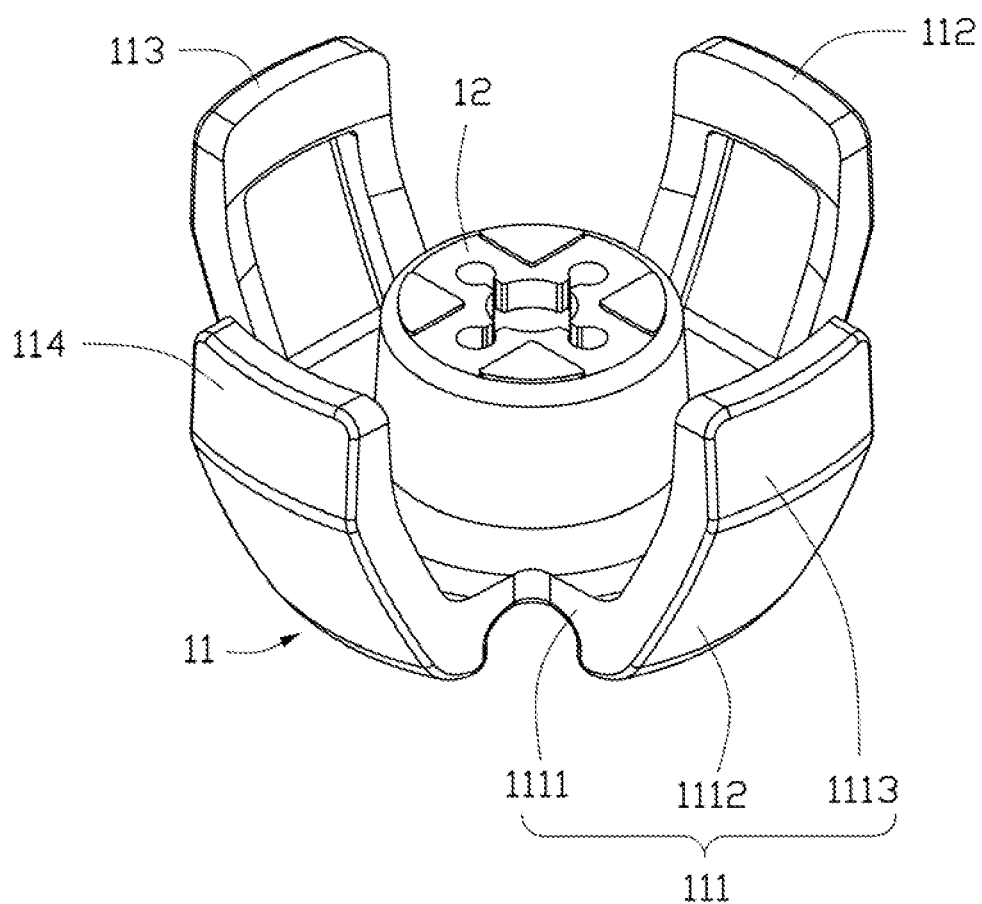
FIG. 2 is an isometric view of a socket of the wireless charging device for vehicles as shown in FIG. 1.

FIG. 2 illustrates that the socket 10 can further include a protruding portion 12 in the substantially central position of the spring portion 11. The spring portion 11 can include a first elastic sheet 111, a second elastic sheet 112, a third elastic sheet 113, and a fourth elastic sheet 114 coupled together and surrounding the protruding portion 12. In other embodiments, the spring portion 11 can include two, three, or more elastic sheets. The first elastic sheet 111 can include a connection portion 1111 connected to the protruding portion 12, an inclined portion 1112, and a clamping portion 1113. The connection portion 1111 can have a characteristic of high-elasticity and can be hard to break. The connection portion 1111 can extend upward to form the inclined portion 1112. The inclined portion 1112 can extend upward to form the clamping portion 1113. The structures of the second elastic sheet 112, the third elastic sheet 113 and the fourth elastic sheet 114 can be the same as that of the first elastic sheet 111.

The protruding portion 12 can be a substantial cylinder, and hollow to conserve materials. The protruding portion 12 can be configured to mount and support the charging holder 20 (shown in FIG. 1). The first elastic sheet 111, the second elastic sheet 112, the third elastic sheet 113 and the fourth elastic sheet 114 can be pressed towards the protruding portion 12 by external pressure extrusion, and the charging holder 20 can be steadily mounted to the protruding portion 12.

Figure 3:
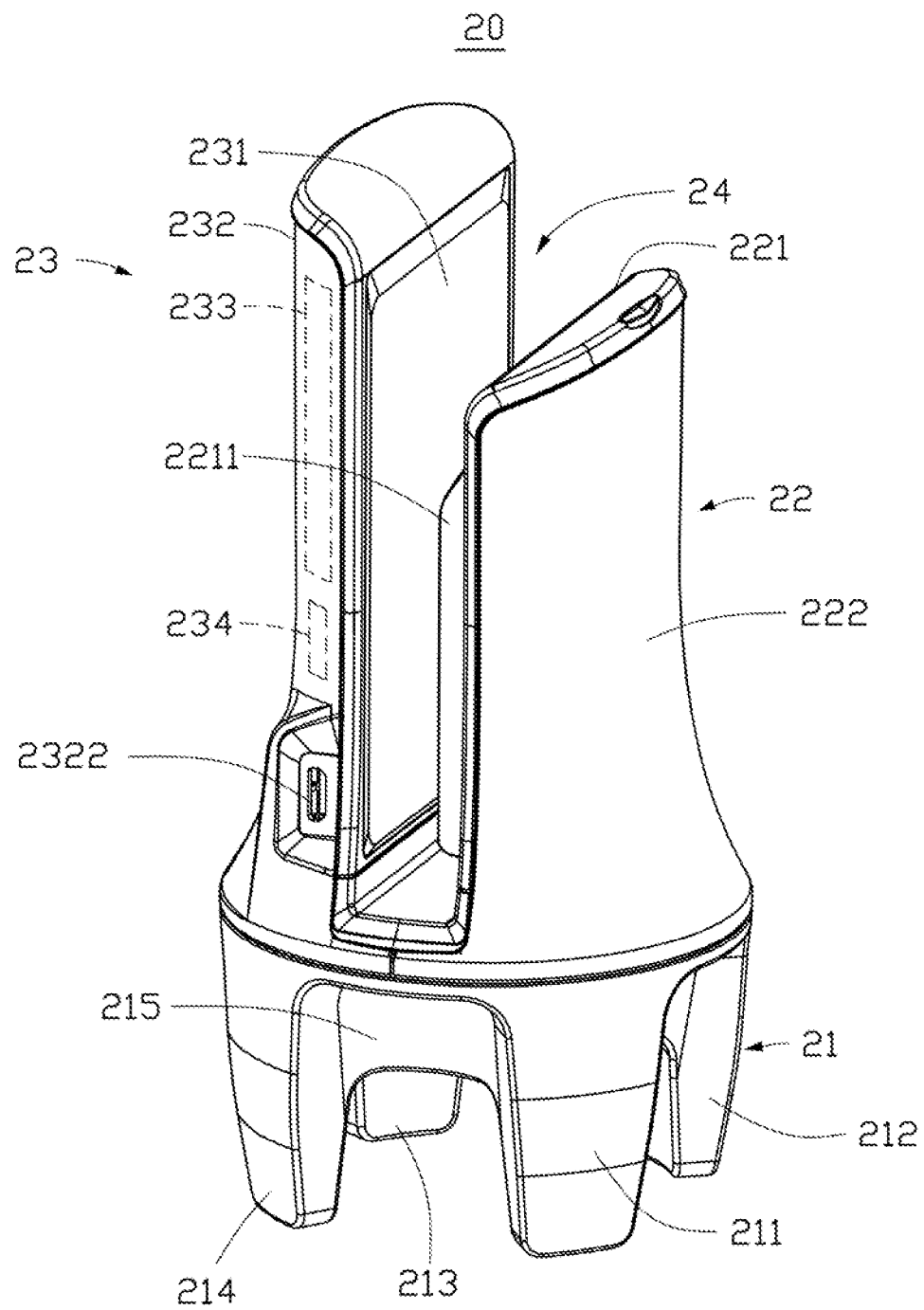
FIG. 3 is an isometric view of a charging holder of the wireless charging device for vehicles as shown in FIG. 1.

FIG. 3 illustrates that the base 21 can include a first claw 211, a second claw 212, a third claw 213, and a fourth claw 214 coupled together. In other embodiments, the base 21 can include two, three, or more claws, and the number of claws can be same as the number of elastic sheets. A receiving portion 215 can be defined between the first claw 211 and the fourth claw 214. The clamping portion 1113 (shown in FIG. 1) can be elastically received in the receiving portion 215. The structures of the second claw 212, the third claw 213, and the fourth claw 214 can be the same as that of the first claw 211.

The sidewall 22 can include a substantially "L"-shaped panel 221 adjacent to the opening 24 and an arc-shaped side panel 222 connected to edges of the panel 221. The panel 221 can include an elastic clamping portion 2211. A spring (not shown) or a substantially "V"-shaped metal dome (not shown) in the first sidewall 22 can provide rebound to the clamping portion 2211. The clamping portion 2211 can move towards or away from the panel 221 elastically.

A structure of the second sidewall 23 can be substantially the same as the first sidewall 22. The second sidewall 23 can include a panel 231, an arc-shaped side panel 232 connected to edges of the panel 231, and a wireless charging module 233 located between the panel 231 and the side panel 232. Another position of the second sidewall 23 adjacent to the base 21 can define a micro-universal serial bus (USB) port 2322. In other embodiments, the micro-USB port 2322 can be a USB port or a universal parallel bus port. In the illustrated embodiment, a height of the second sidewall 23 can be higher than that of the first sidewall 22 to allow an electronic device to be inserted into the opening 24 along the panel 231.

The second sidewall 23 can further include a wireless communication module 234 located between the panel 231 and the side panel 232. In other embodiments, the wireless communication module 234 can be located in the first sidewall 22 or other places. The wireless communication module 234 can be a BLUETOOTH module or a near-field-communication (NFC) module.

An electronic device (not shown) can be inserted into the opening 24, and resisted against the second sidewall 23 elastically by the elasticity of the clamping portion 2211. Then, the wireless charging module 233 can charge the electronic device. The wireless communication module 234 can transmit data via a wireless connection between the electronic device and a computer (not shown) or a media terminal (not shown) of the vehicle for transmission.

The embodiments shown and described above are only examples. Many details are often found in the art such as the other features of the wireless charging device for vehicles 100. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless charging device for vehicles configured for charging an electronic device, comprising:
   a socket comprising
      a spring portion distributed in a petal shape;
      a protruding portion in the central position of the spring portion; and
   a charging holder mounted in the socket, comprising
      a base; and
      a first sidewall and a second sidewall extended from the base, and
      an opening between the first sidewall and the second sidewall;
   wherein the opening is configured for inserting the electronic device, and
      a wireless charging module is located in the second sidewall.

2. The wireless charging device for vehicles as claimed in claim 1, wherein the first sidewall comprises a panel adjacent to the opening, and an arc-shaped side panel connected to edges of the panel.

3. The wireless charging device for vehicles as claimed in claim 2, wherein an elastic clamping portion is located in the panel.

4. The wireless charging device for vehicles as claimed in claim 1, wherein the spring portion comprises a plurality of elastic sheets coupled together.

5. The wireless charging device for vehicles as claimed in claim 4, wherein each elastic sheet comprises a connection portion connected to the protruding portion, an inclined portion, and a clamping portion.

6. The wireless charging device for vehicles as claimed in claim 4, wherein the base comprises a plurality of claws.

7. The wireless charging device for vehicles as claimed in claim 6, wherein
   a plurality of receiving portions are defined between the claws, and
   the receiving portions are configured for receiving the elastic sheets.

8. The wireless charging device for vehicles as claimed in claim 1, wherein the second sidewall comprises a panel adjacent to the opening, and an arc-shaped side panel is connected to edges of the panel.

9. The wireless charging device for vehicles as claimed in claim 1, wherein a position of the second sidewall adjacent to the base defines a universal bus port or other bus ports.

10. The wireless charging device for vehicles as claimed in claim 1, wherein a wireless communication module is mounted in the second sidewall, and the wireless communication module can wirelessly connect the electronic device to the vehicle.

* * * * *